US005615311A

United States Patent [19]
Fukushima et al.

[11] Patent Number: 5,615,311
[45] Date of Patent: Mar. 25, 1997

[54] IMAGE PROCESSING APPARATUS

[75] Inventors: Hisashi Fukushima, Yokohama; Sono Gu, Ohmiya, both of Japan

[73] Assignee: Canon Kabushiki Kaisha, Tokyo, Japan

[21] Appl. No.: 347,160

[22] Filed: Nov. 23, 1994

Related U.S. Application Data

[63] Continuation of Ser. No. 78,857, Jun. 21, 1993, abandoned, which is a continuation of Ser. No. 523,831, May 16, 1990, abandoned, which is a continuation of Ser. No. 337,175, Apr. 12, 1989, abandoned.

[30] Foreign Application Priority Data

Apr. 18, 1988 [JP] Japan .................................. 63-95841

[51] Int. Cl.⁶ .................................................. G06H 15/00
[52] U.S. Cl. ............................................ 395/107; 395/109
[58] Field of Search ................................. 395/112, 101, 395/109, 107; 369/106, 116; 347/131, 135, 142–145, 237, 247, 246, 251, 252–254; 355/203, 204, 207, 208, 209

[56] References Cited

U.S. PATENT DOCUMENTS

| | | | |
|---|---|---|---|
| 4,180,822 | 12/1979 | Hudson | 346/108 |
| 4,283,785 | 8/1981 | Miyauchi et al. | 369/116 |
| 4,751,523 | 1/1988 | Foelich | 346/160 |
| 4,814,791 | 3/1989 | Ohara et al. | 346/108 |
| 4,864,419 | 9/1989 | Saito et al. | 348/153.1 |

FOREIGN PATENT DOCUMENTS

| | | |
|---|---|---|
| 0216462 | 4/1987 | European Pat. Off. . |
| 0264886 | 4/1988 | European Pat. Off. . |
| 0271178 | 6/1988 | European Pat. Off. . |

*Primary Examiner*—Arthur G. Evans
*Attorney, Agent, or Firm*—Fitzpatrick, Cella, Harper & Scinto

[57] ABSTRACT

An image processing apparatus comprises image signal input means, tone means for toning the input image signal to produce a pulse width modulated signal, beam generation means for generating a beam modulated by the pulse width modulated signal, and detection means for detecting an output power of the beam generated by the beam generation means. The tone means switches an output mode of the pulse width modulated signal in accordance with the detection output of the detection means.

6 Claims, 6 Drawing Sheets

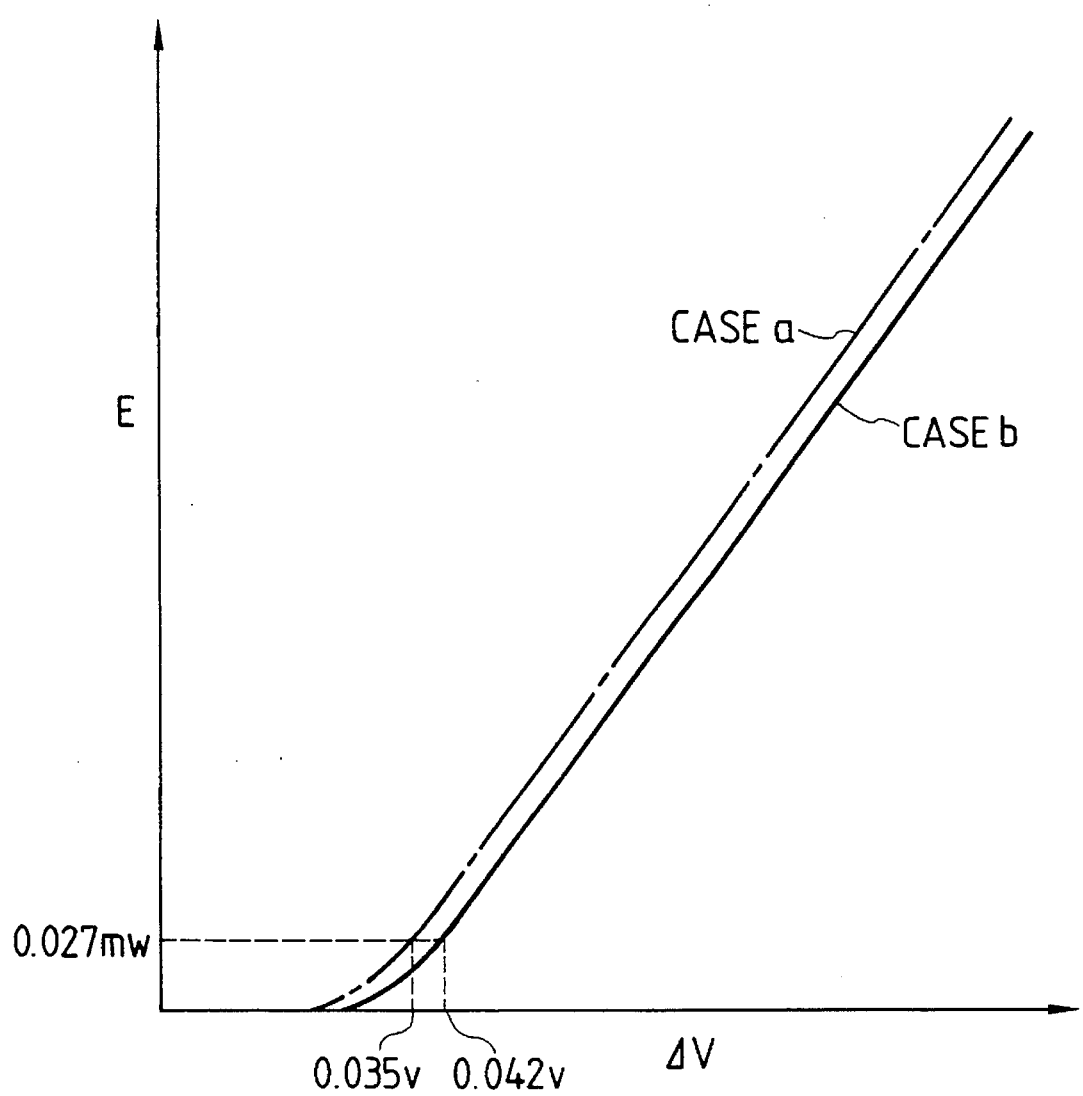

IMAGE PROCESSING APPARATUS

This application is a continuation of application Ser. No. 08/078,857 filed Jun. 21, 1993, now abandoned, which was a continuation of application Ser. No. 07/523,831 filed May 16, 1990, now abandoned, which was a continuation of application Ser. No. 07/337,175 filed Apr. 12, 1989, now abandoned.

BACKGROUND OF THE INVENTION

1. Field of the Invention

The present invention relates to an image processing apparatus for toning an input image signal.

2. Related Background Art

The assignee of the present invention has a Japanese application of a method for binarizing a digital image signal to form an image by a laser beam printer in which a digital image signal is converted to an analog signal and the converted analog signal is composed with a pattern signal such as a ramp (triangular) wave signal to generate a pulse width modulated binary signal in order to improve tonality.

FIG. 2 shows the above method. A digital video signal is latched in a latch 1 by a video clock VK for synchronization. The video clock VK is derived by frequency-dividing a master clock MK by a J-K flip-flop 5. The video signal is converted to an analog video signal AV by a D/A converter 2. An output of the D/A converter 2 is converted to a voltage level by a resistor 3, and it is supplied to one input terminal of a comparator 4. On the other hand, the master clock MK is frequency-divided by a period switching signal from a frequency divider 6, and it is further frequency-divided by a J-K flip-flop 7 to generate a clock signal SK having a duty factor of 50%. It has the same ratio of period as a ratio of frequency division in the frequency divider 6 with respect to the video clock VK. The clock SK is integrated by a ramp wave generator 8 to produce a ramp wave C which is supplied to the other input terminal of the comparator 4 for comparison with the analog video signal AV. The comparator 4 produces a pulse width modulated signal E based on the comparison result of the analog video signal and the ramp wave signal. The pulse width modulated signal E is supplied to a drive circuit 21 which on/off-modulates a semiconductor laser 17 in accordance with the pulse width modulated signal to emit a laser beam 11. The laser beam 11 emitted from the semiconductor laser 17 is scanned by a scanner 18 which comprises a rotary polygon mirror and a galvanometer. Numeral 19 denotes a lens for focusing the laser beam 11 to a spot on a photo-conductor 9, and numeral 20 denotes a mirror for deflecting a light path.

The photo-conductor 9 is an electro-photographic photo-conductor drum which is rotated in the direction of arrow A. The photo-conductor 9 is first uniformly charged by a charger 10 and the scanned by and exposed to the laser beam 11 which is on/off-modulated in accordance with the modulation signal, generally perpendicularly to the direction of rotation of the photo-conductor 9. An electrostatic latent image thus formed on the photo-conductor 9 is visualized by a developing unit 12.

A visible toner image formed on the photo-conductor 9 is transfered to a transfer material 14 by a transfer charger 13. The visible toner image transferred to the transfer material 14 is fixed by a fixing unit (not shown), and the toner remaining on the photo-conductor 9 after the transfer is removed by a cleaner 15. Then, the charges remaining on the photo-conductor 9 are discharged by a discharging light from a lamp 16. Then, the above process is repeated.

A relationship between a level of the analog video signal and a level of the ramp wave may be one of those shown in FIGS. 3(a), 3(b) and 3(c) depending on a type of desired image.

In FIG. 3(a), for example, if a relationship between a white level $\alpha$ of the analog video signal and a maximum value of the ramp wave varies for some reason such as thermal characteristic of the ramp wave generator, the tone in a low image density area will significantly vary even if the variation of the relationship is small. If a relationship between a black level $\beta$ of the analog video signal and a minimum value of the ramp wave varies, the tone in a high image density area will be significantly varied. Even if the relationship between the white and black levels of the analog video signal and the ramp wave does not essentially vary, the image will be significantly affected by a slight shift of the levels, and the correction thereof is difficult to attain even by a synchroscope. Further, even if the relationship between the white and black levels of the analog video signal and the ramp wave is kept constant, tones in the high image density area and the low image density area significantly vary by the variation and difference of laser beam power, laser beam response and E-V characteristic of the photo-conductor where the laser beam printer is used.

The toning of the input image signal is disclosed in the following U.S. patents and U.S. patent applications assigned to the assignee of the present invention.

U.S. Pat. No. 4,800,442
U.S. Ser. No. 225,644 filed on Jul. 27, 1988
U.S. Ser. No. 897,053 filed on Aug. 15, 1986
U.S. Ser. No. 898,096 filed on Aug. 20, 1986
U.S. Ser. No. 237,614 filed on Aug. 24, 1988
U.S. Ser. No. 224,255 filed on Jul. 26, 1988
U.S. Ser. No. 188,712 filed on Apr. 29, 1988
U.S. Pat. No. 4,763,199
U.S. Ser. No. 923,026 filed on Oct. 24, 1986
U.S. Ser. No. 932,030 filed on Nov. 18, 1986
U.S. Ser. No. 010,539 filed on Feb. 3, 1987
U.S. Ser. No. 235,761 filed on Aug. 23, 1988
U.S. Ser. No. 161,266 filed on Feb. 18, 1988
U.S. Ser. No. 282,896 filed on Dec. 12, 1988
U.S. Ser. No. 033,462 filed on Apr. 2, 1987
U.S. Ser. No. 090,238 filed on Aug. 25, 1987
U.S. Ser. No. 081,442 filed on Aug. 4, 1987
U.S. Ser. No. 162,303 filed on Feb. 29, 1988
U.S. Ser. No. 119,622 filed on Nov. 12, 1987

SUMMARY OF THE INVENTION

It is an object of the present invention to eliminates the shortcomings described above.

It is another object of the present invention to improve an image processing apparatus.

It is a further object of the present invention to provide an image processing apparatus which reproduces a high quality of image.

It is still a further object of the present invention to provide an image processing apparatus which can reproduce an excellent image with a simple construction.

It is a further object of the present invention to provide an image processing apparatus which can reproduce a high quality of image at a high speed.

It is another object of the present invention to provide an image processing apparatus which can reproduce an image with stable tonality.

It is a further object of the present invention to provide an image processing apparatus which corrects a characteristic of an image processing circuit to produce an optimum output image.

Other objects of the present invention will be apparent from the following description and claims when taken in conjunction with the accompanying drawings.

BRIEF DESCRIPTION OF THE DRAWINGS

FIG. 5 shows a laser beam output characteristic.

DETAILED DESCRIPTION OF THE PREFERRED EMBODIMENTS

Figure 1:
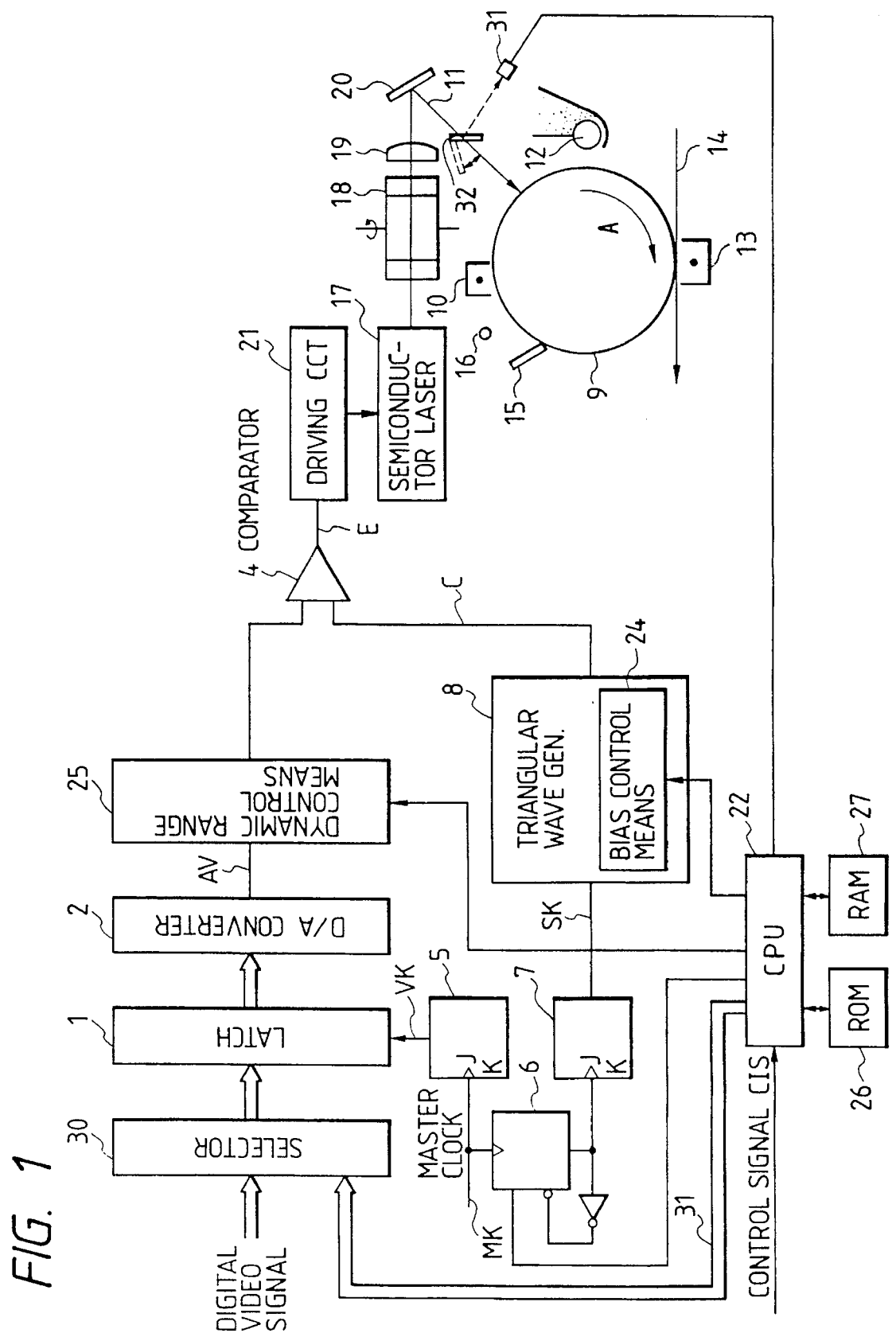
FIG. 1 shows an embodiment of an image processing apparatus of the present invention.
Figure 2:
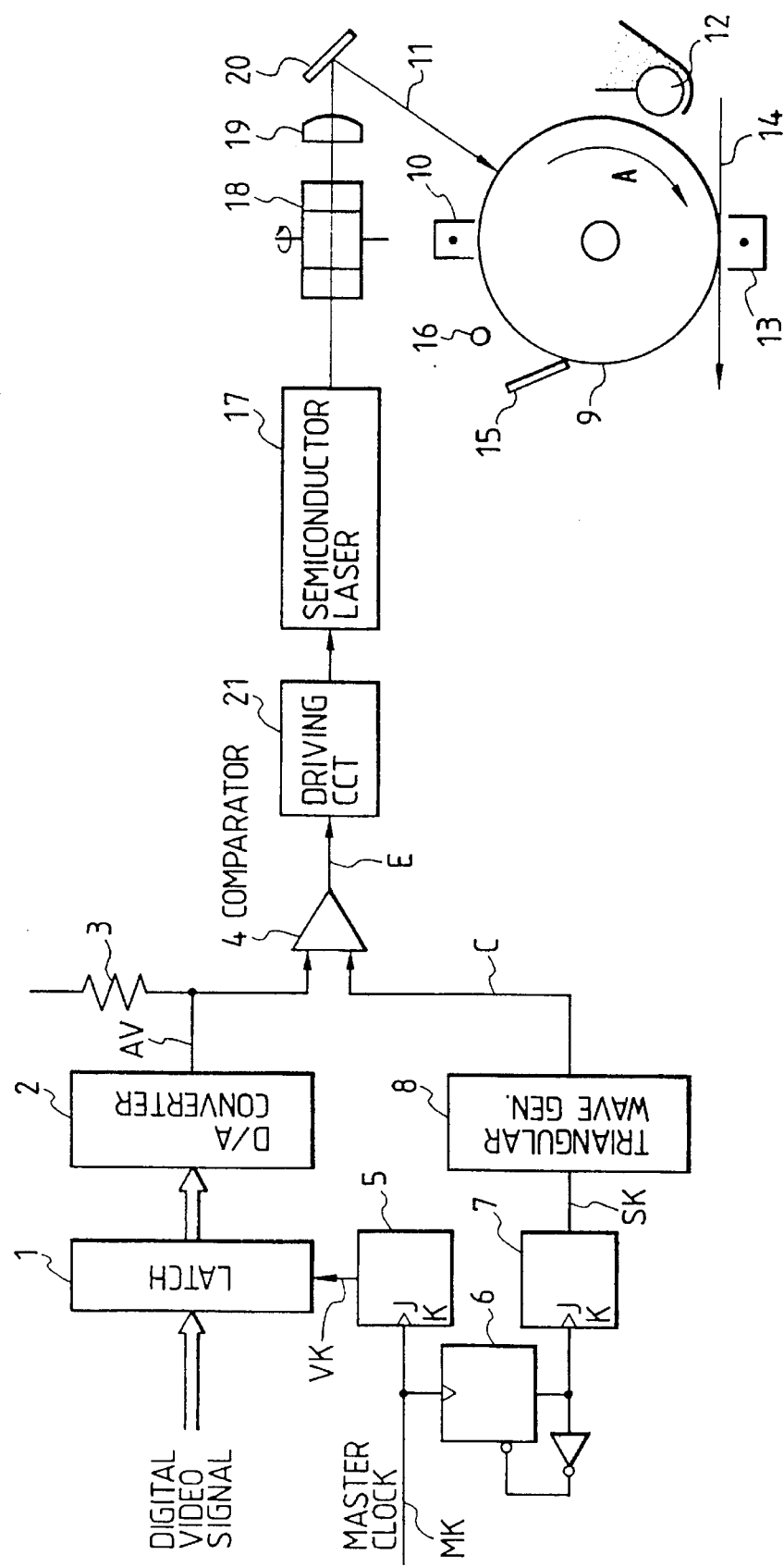
FIG. 2 shows a circuit of a prior image processing apparatus of the assignee of the present invention.
Figure 3A:
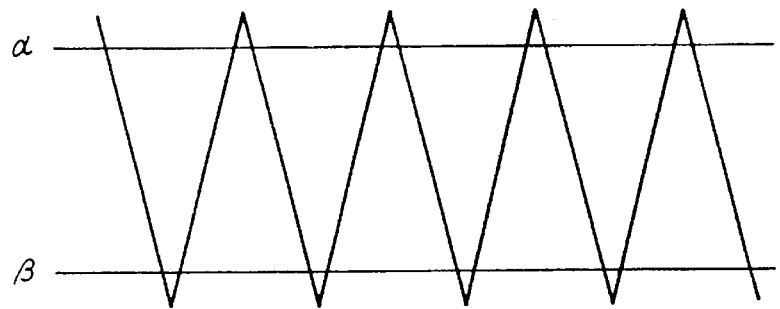
FIGS. 3(a), 3(b) and 3(c) show relationships between analog video signals and ramp waves.
Figure 3B:
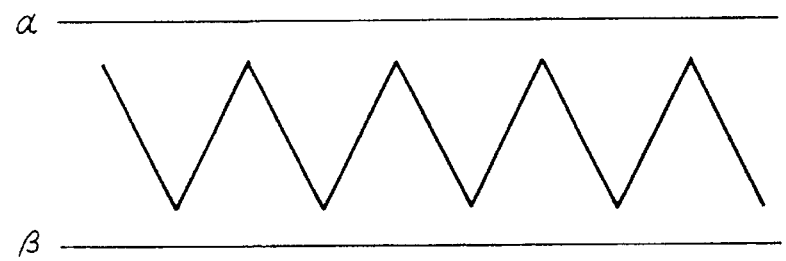
Figure 3C:
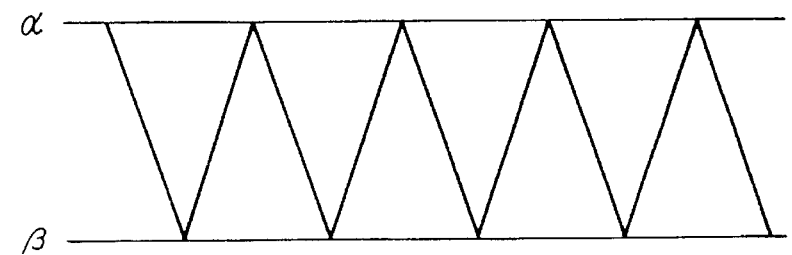

FIG. 1 shows a circuit diagram of one embodiment of the image processing apparatus of the present invention. The like elements to those shown in FIG. 2 are designated by the like numerals and the explanation thereof is omitted.

Figure 6:
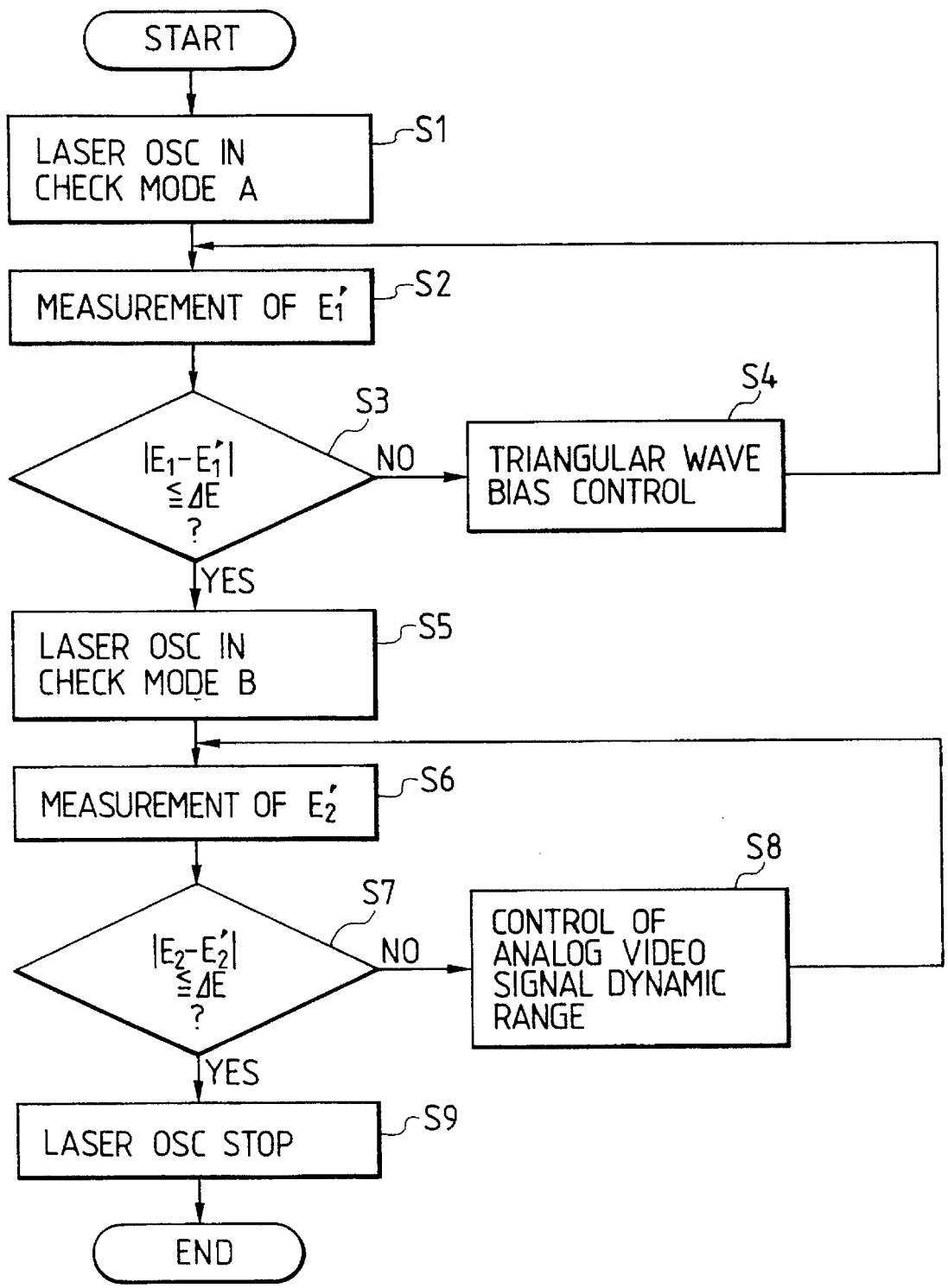
FIG. 6 shows a flow chart in a control mode.

Numeral 22 denotes a CPU for controlling the circuit elements, numeral 26 denotes a ROM which stores a program shown in a flow chart of FIG. 6, numeral 27 denotes a RAM which is used as a work area when the CPU 22 is operated, and numeral 30 denotes a selector which selects a digital video signal or a check mode signal on a signal line 31 supplied from the CPU 22, in accordance with selection information on the signal line 31, by an instruction from the CPU 22. Numeral 9 denotes an electro-photographic photo-conductor drum which is rotated in the direction of arrow A. The photo-conductor 9 is first uniformly charged by a charger 10 and then scanned by and exposed to a laser beam 11 which is on/off-modulated by a modulation signal, generally perpendicularly to the direction of rotation of the photo-conductor 9. An electrostatic latent image thus formed on the photo-conductor 9 is developed and visualized by a developing unit 12. In the present embodiment, the developing unit 12 is a so-called reversal developing unit in which toner is deposited on an area of the photo-conductor 9 exposed by the laser beam, that is, a light area. Thus, the toner supplied to the photo-conductor 9 by the developing unit 12 is charged to the same polarity as the charging electrode for the photo-conductor of the charger 10. In other words, the laser beam 11 is modulated such that it exposes the areas of the photo-conductor 9 on which toner is to be deposited.

In any event, the visible toner image formed on the photo-conductor 9 is transferred to a transfer material 14 by a transfer charger 13. The visible toner image transferred to the transfer material 14 is fixed by a fixing unit (not shown), on the other hand, toners remaining on the photo-conductor 9 after the transfer are removed by a cleaning unit 15. Thereafter, the charges remaining on the photo-conductor 9 are discharged by a discharging light of a lamp 16, and the above process is repeated.

The laser beam 11 is emitted from a semiconductor laser 17. The semiconductor laser 17 is driven by a driver 21 to which a pulse width modulated signal E supplied from a comparator 4 is supplied so that the laser beam 11 which is on/off-modulated in accordance with the modulated signal E is emitted. When an image corresponding to a digital video signal is to be formed (image forming mode), the pulse width modulated signal E is a signal which corresponds to the digital video signal. In any case, the laser beam 11 emitted from the semiconductor laser 17 is scanned by a scanner 18 such as a rotary polygon mirror or a galvanometer. Numeral 19 denotes a lens for focusing the laser beam to a spot on the photo-conductor 9, and numeral 20 denotes a mirror for deflecting a light path.

In the image forming mode, the pulse width modulated signal E is produced based on the digital video signal as is done in the prior art apparatus, and the pulse width modulation signal E is supplied to a drive circuit 21. The semiconductor laser 17 is turned on and off in accordance with the pulse width modulated signal to produce an image with tonality.

In the present embodiment, a control mode is effected prior to the image forming mode.

In the control mode, all or a portion of the light beam from the semiconductor laser 17 is directed to a laser power sensor 31. In FIG. 1, the light path is switched toward the laser power sensor 31 by a movable mirror 32.

In the control mode of the present embodiment, the output image is corrected by a bias control (regulation) of the ramp wave (check mode A) and a dynamic range control of the analog video signal (check mode B).

The correction process is shown in the flow chart of FIG. 6 and the operation thereof is explained below. The control mode is effected prior to actual record operation, and it is started after a control signal CIS has been transmitted to the CPU 22.

Figure 4A:
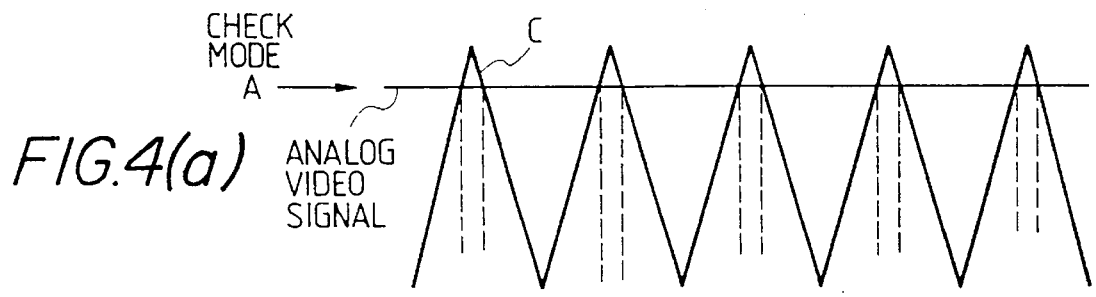
FIGS. 4(a), 4(b), 4(c) and 4(d) show pulse width modulation in a check mode.
Figure 4B:
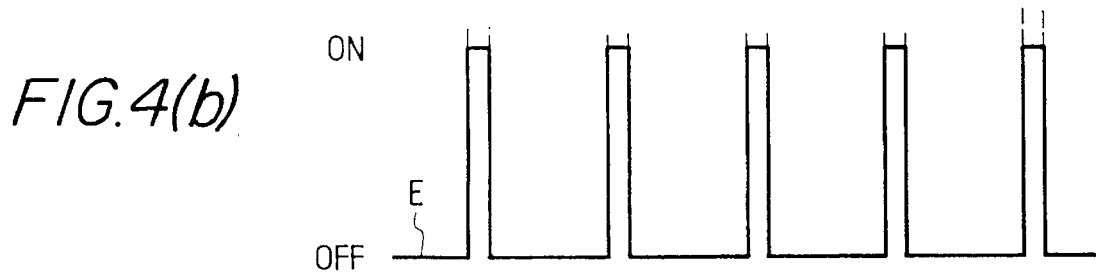

First, the check mode A is effected. In a step S1, the digital video signal having a first predetermined level is supplied from the CPU 22 to the D/A converter 2 through the signal line 31 and the selector 30. As a result, the D/A converter 2 generates a check mode A analog video signal AV shown in FIG. 4(a). This analog video signal is supplied to the comparator 4 through dynamic range control means 25 for comparison with the ramp wave which is synchronized with the analog video signal. As a result, the comparator 4 generates a pulse width modulated signal shown in FIG. 4(b) to drive the semiconductor laser 17. The laser beam 11 which is on/off-modulated in accordance with the pulse width modulated signal is emitted from the semiconductor laser 17.

In the next step S2, a power $E_1'$ of the emitted laser beam is detected by the laser power sensor 31.

Then, the CPU 22 controls bias control means 24 in the ramp wave generation means 8 in accordance with the detected power $E_1'$ of the laser beam. The control of the power is repeated (steps S3 and S4) until a difference between the actual power $E_1'$ of the laser beam 11 and a desired power $E_1$ reaches less than a predetermined amount $\Delta E$. The digital video signal used in the check mode A is selected such that the turn-off time of the semiconductor laser 17 to be longer than the turn-on time and it has a predetermined level.

The desired power $E_1$ may be selected based on an output light characteristic of the semiconductor laser 17 and the level of the digital video signal in the check mode A. In any case, the bias control means 24 is controlled to control the bias for the ramp signal C generated by the ramp wave generating means until the difference between the desired power $E_1$ and the actual power $E_1'$ reaches less than the predetermined amount.

When the check mode A is completed, the check mode B is then effected in steps S5 et seq.

Figure 4C:
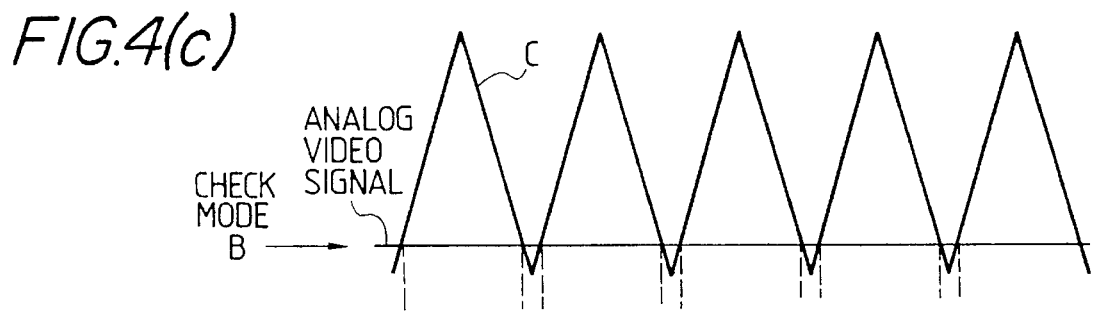
Figure 4D:
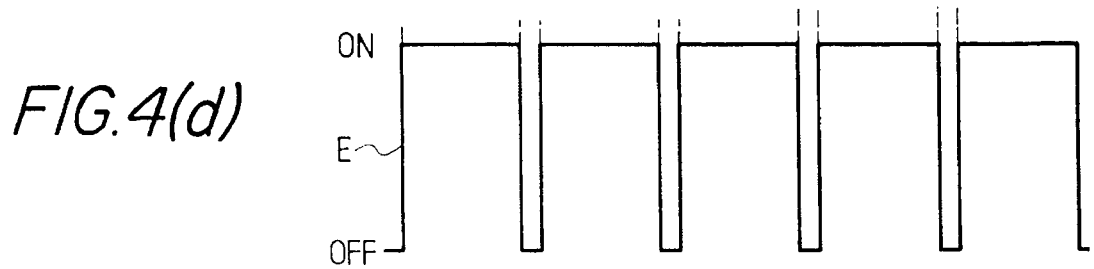

In the step S5, a digital video signal having a second predetermined level is supplied from the CPU 22 to the D/A converter 2 through the signal line 31 and the selector 30. As a result, the D/A converter 2 generates a check mode B analog video signal AV shown in FIG. 4(c). The analog video signal is compared with the ramp wave signal by the comparator 4 as is done in the check mode A, and the semiconductor laser 17 is driven in accordance with the pulse width modulated signal supplied from the comparator 4.

In a step S6, a power $E_2'$ of the laser beam emitted from the semiconductor laser 17 is detected by the laser power sensor 31 as is done in the check mode A. The CPU 22 controls the dynamic range of the analog video signal AV by the dynamic range control means 25 in accordance with the detected power $E_2'$ of the laser beam, and repeats the control of the power until a difference between the actual power $E_2'$ and a desired power $E_2$ reaches less than the predetermined amount $\Delta E$ (steps S7 and S8).

The digital video signal used in the check mode B is selected such that it causes the turn-on time of the semiconductor laser 17 to be longer than the turn-off time, and it has a predetermined level.

The desired power $E_2$ is set based on the output beam characteristic of the semiconductor laser 17 and the level of the digital video signal in the check mode B.

The dynamic range control means may be constructed by a potentiometer to change the voltage of the analog video signal AV.

After the check modes have been completed, the semiconductor laser 17 is deactivated in a step S9 and the series of check mode processes are terminated.

In the present embodiment, the power of the laser beam is controlled such that the difference between the power of the semiconductor laser 17 and the desired power is less than the predetermined amount $\Delta E$. The amount $\Delta E$ is explained below.

FIG. 5 shows a light emission characteristic of the semiconductor laser. It shows a change of the power E of the laser beam of the semiconductor laser for the voltage difference $\Delta V$.

The voltage difference $\Delta V$ is defined by a difference between a peak voltage Vp of the ramp wave and the analog video signal AV in the check mode A when the dynamic range of the ramp wave is one volt, that is, $\Delta V=Vp-AV$.

In the present embodiment, as seen from FIG. 5, the output power E when the semiconductor laser 17 is completely turned off is zero, and the output power E of the semiconductor laser increases as $\Delta V$ increases. When the circuit was controlled with the output power E of 0.027±0.004 mW, a very stable image was produced. The voltage difference $\Delta V$ was 0.035 volt (case a) and 0.042 volt (case b) depending on the machine used. In both cases, same reproduced image was obtained.

This is because the effect to the image due to variation and change of the laser output power and the laser output response can be compensated by controlling the circuit based on the output power of the laser beam of the semiconductor laser 17, and a latitude of control to obtain an excellent image is widened.

In the present embodiment, the analog video signal and the ramp wave are controlled by two parameters, the dynamic range of the analog video signal and the bias of the ramp wave. Other methods for controlling the relationship between the analog video signal and the ramp wave such as controlling the amplitude and bias of the ramp wave while keeping the analog video signal constant may be used.

After the control mode is terminated, the image forming mode is started by an image forming instruction (print instruction) immediately thereafter or after a pause.

The control mode need not necessarily be automatically effected but the output powers of the semiconductor laser in the check modes A and B may be output upon depression of a control mode switch and the relationship between the analog video signal and the ramp wave may be controlled by a potentiometer.

While the laser beam printer has been described in the present embodiment, the present invention is also applicable to an image processing apparatus which uses an LED array having a number of small light emitting diodes (LED's) arranged therein and in which the respective LED's of the array are turned on and off in accordance with the modulation signal to expose the beams to the electro-photographic photo-conductor to form an image.

In the present embodiment, the reversal development system in which the toner is deposited on the areas of the photo-conductor which are exposed by the light beam is used. The present invention is also applicable to an image processing apparatus which uses a normal development system in which the toner is deposited on the unexposed areas of the photo-conductor or the dark areas.

The present invention is not limited to the above embodiment but various modifications thereof may be made without departing from the claims.

What we claim is:

1. In an image processing apparatus having generating means for generating a pattern signal having a predetermined period, comparing means for comparing an analog signal with the pattern signal and for generating a pulse width modulated signal, emitting means for emitting a light modulated by the pulse width modulated signal, and supplying means for supplying an image signal to said comparing means as the analog signal during an image forming operation, an adjusting method for adjusting a relative relation between the pattern signal and the analog signal, said adjusting method comprising the steps of:

applying a predetermined level signal to said comparing means as the analog signal;

detecting an output power (E) of the modulated light emitted from said emitting means when the predetermined level signal is applied to said comparing means; and adjusting the relative relation between the pattern signal and the analog signal on the basis of the output power (E) detected in said detecting step so that a difference ($\Delta V$) between a peak level of the pattern signal and the predetermined level signal applied to said comparing means is within a range having a proportional relation to the output power (E) of said emitting means.

2. A method according to claim 1, wherein in said adjusting step, a bias of the pattern signal is adjusted.

3. A method according to claim 2, further comprising the step of applying a second predetermined level signal to said comparing means as the analog signal and a step of adjusting a dynamic range of the analog signal.

4. A method according to claim 1, wherein in said applying step, a predetermined level signal converted from a predetermined digital value by D/A conversion means is applied to said comparing means.

5. A method according to claim 1, wherein said method is performed prior to an actual image forming operation.

6. A method according to claim 1, wherein said pattern signal is a ramp wave signal.

* * * * *